United States Patent
Tsukui et al.

(10) Patent No.: US 6,557,045 B1
(45) Date of Patent: Apr. 29, 2003

(54) APPARATUS FOR EDITING E-MAIL ADDRESS AND E-MAIL APPARATUS

(75) Inventors: Minoru Tsukui, Narashino (JP); Kiyoshi Toyoda, Kita Kunitachi (JP)

(73) Assignee: Matsushita Graphic Communication Systems, Inc., Tokyo (JP)

( * ) Notice: Subject to any disclaimer, the term of this patent is extended or adjusted under 35 U.S.C. 154(b) by 0 days.

(21) Appl. No.: 09/395,181

(22) Filed: Sep. 14, 1999

(30) Foreign Application Priority Data

Sep. 18, 1998 (JP) .......................................... 10-264644

(51) Int. Cl.[7] .............................................. G06F 15/16
(52) U.S. Cl. ....................... 709/245; 709/206; 709/217; 709/219; 707/505; 707/506; 379/100.08; 358/402
(58) Field of Search ................................ 709/206, 202, 709/203, 218, 235, 200, 217, 219, 224, 227, 245; 707/505, 506, 507, 508, 3, 2, 100, 103, 500, 513; 379/100.08; 358/402

(56) References Cited

U.S. PATENT DOCUMENTS

| 4,825,464 A | | 4/1989 | Wen |
| 5,881,233 A | * | 3/1999 | Toyoda et al. ............... 709/200 |
| 5,944,787 A | * | 8/1999 | Zoken ......................... 358/402 |
| 6,182,029 B1 | * | 1/2001 | Friedman ....................... 704/9 |
| 6,278,992 B1 | * | 8/2001 | Curtis et al. .................... 704/9 |
| 6,321,222 B1 | * | 11/2001 | Soderstrom et al. ......... 707/100 |
| 6,324,538 B1 | * | 11/2001 | Wesinger et al. ............. 707/10 |
| 6,360,010 B1 | * | 3/2002 | Hu et al. ..................... 358/464 |

FOREIGN PATENT DOCUMENTS

| JP | 2143758 | 6/1990 |
| JP | 6164645 | 6/1994 |
| JP | 10-42065 | 2/1998 |

* cited by examiner

*Primary Examiner*—Ario Etienne
*Assistant Examiner*—Shaojun Wen
(74) *Attorney, Agent, or Firm*—Greenblum & Bernstein, P.L.C.

(57) ABSTRACT

An e-mail apparatus comprises a memory to which a character string showing a domain name is stored; a display for dividing an e-mail address into a plurality of segments including a segment of the domain name so as to be displayed and for displaying the character string of the domain name stored in the memory at the segment of the domain name; a button for changing the domain name displayed on the display to other domain name stored in the memory; a dividing section, which configures to divide the character string of the e-mail as a sender included in the received e-mail into a plurality of segments; and a storing section, which configures to store the character string, corresponding to the segment of at least the domain name in the divided character, to the memory.

7 Claims, 8 Drawing Sheets

| USER NAME AREA | SUB-DOMAIN 1 AREA | SUB-DOMAIN 2 AREA | TOP DOMAIN AREA |
|---|---|---|---|
| tsukui | rdmg.mgcs | mei | co.jp |
| yoshida | rdnn.mgcs | CORPORATION | ad.jp |
| okiyama | rdgl.mgcs | ORGANIZATION | go.jp |
| saitoh | rdsn.mgcs | GROUP | or.jp |
| suzuki | Pas | SOCIETY | edu |
| | COMPANY NAME | | net |
| | ORGANIZATION NAME | | com |
| | | | COUNTRY |

FIG. 5

| TOP DOMAIN NAME | SUB-DOMAIN NAME2 | SUB-DOMAIN NAME1 | USER NAME |
|---|---|---|---|
| co.jp | mei | rdmg_mgcs<br>rdnn_mgcs | tsukui<br>okiyama |
| com | pana | bbb | aaa |

FIG. 8

APPARATUS FOR EDITING E-MAIL ADDRESS AND E-MAIL APPARATUS

BACKGROUND OF THE INVENTION

1. Field of the Invention

The present invention relates to an e-mail apparatus which is inputted an e-mail address to designate an e-mail destination, the e-mail address being composed of a character string such as alphabets, and numerals, and more particularly to an e-mail apparatus, which can reduce the number of characters to be input by an operator.

2. Description of the Related Art

Internet facsimile apparatuses are communication apparatuses that make possible to perform e-mail communications based on conventional facsimile apparatuses. In the Internet facsimile apparatuses, similar to the conventional facsimile apparatuses, a telephone number and an e-mail address are input from a operation panel. The operation panel comprises keys such as keys of a 10-button keypad, a start key, a stop key, a one-touch key, etc such that the operation panel is configured to be suitable for an input operation of numerals typified by the input operation of a telephone number.

However, in the operation panel provided in the conventional facsimile apparatus, alphabet keys are not arranged. For this reason, there is considered a character inputting method in which a plurality of alphabets is allocated to one 10-button keypad to select alphabets in accordance with the number of depression times for keys of the 10-button keypad (U.S. Pat. No. 4,825,464).

Such character inputting method is largely inferior to a keyboard in operability for inputting the character string typified by the e-mail address.

SUMMARY OF THE INVENTION

An object of the present invention is to provide an e-mail apparatus, which can easily input an e-mail address and which has a good usability.

An address editing apparatus of the present invention divides an e-mail address of a received e-mail at a predetermined segment and stores data of the divided e-mail address.

According to the present invention, e-mail address data can be divided into a top domain name, a sub-domain name, a user name, etc., and edited, and the use of this division makes it possible to facilitate an input of e-mail address at an input time.

More specifically, the e-mail address is divided into at least the user name and the domain name, and at least the domain name is stored.

Also, the e-mail address is divided into a top domain name and a sub-domain name, and they are stored distinguishably. This allows the e-mail address to be more specifically edited. Also, this makes it possible to further facilitate the input operation of e-mail address and to realize the input operation with general versatility.

The e-mail apparatus of the present invention stores address data of an e-mail address in a state that a top domain name and a sub-domain name are distinguished from each other. At an address input time, the top domain name and the sub-domain name stored in the memory are input not directly but selectively, and e-mail transmission is carried out with respect to the input address.

According to the e-mail apparatus, the use of data of the divided and entered e-mail address facilities the input of the e-mail address. Also, occurrence of an erroneous input can be prevented so as to realize an apparatus having good usability.

Also, the e-mail apparatus of the present invention comprises a display for displaying an e-mail address to be input and buttons, which are arranged in the vicinity of the display to correspond to the top domain name, which is input unit, and the sub-domain name, for carrying out an address decision.

By the above-mentioned configuration, since e-mail address data to be selected and buttons to operate e-mail address data are associated with each other, the input operation can be facilitated.

Also, the address editing apparatus of the present invention extracts an e-mail address of the received e-mail and divides the extracted e-mail address into an upper hierarchical domain name and a lower hierarchical domain name. The divided upper hierarchical domain name is entered, and the lower hierarchical domain name is entered and managed to be associated with the upper hierarchical domain name.

According to the present invention, since the upper hierarchical domain name and the upper hierarchical domain name are managed to be associated with each other, this makes it possible to efficiently display the address, which an operator needs.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 5 is a view showing an internal configuration of a backup memory of the e-mail apparatus of the present invention;

FIG. 8 is a view showing the other managing method of a backup RAM 106 in the e-mail apparatus according to the present invention.

DETAILED DESCRIPTION OF THE PREFERRED EMBODIMENTS

An embodiment of the present invention will now be specifically described with reference to the drawings accompanying herewith.

Figure 1:
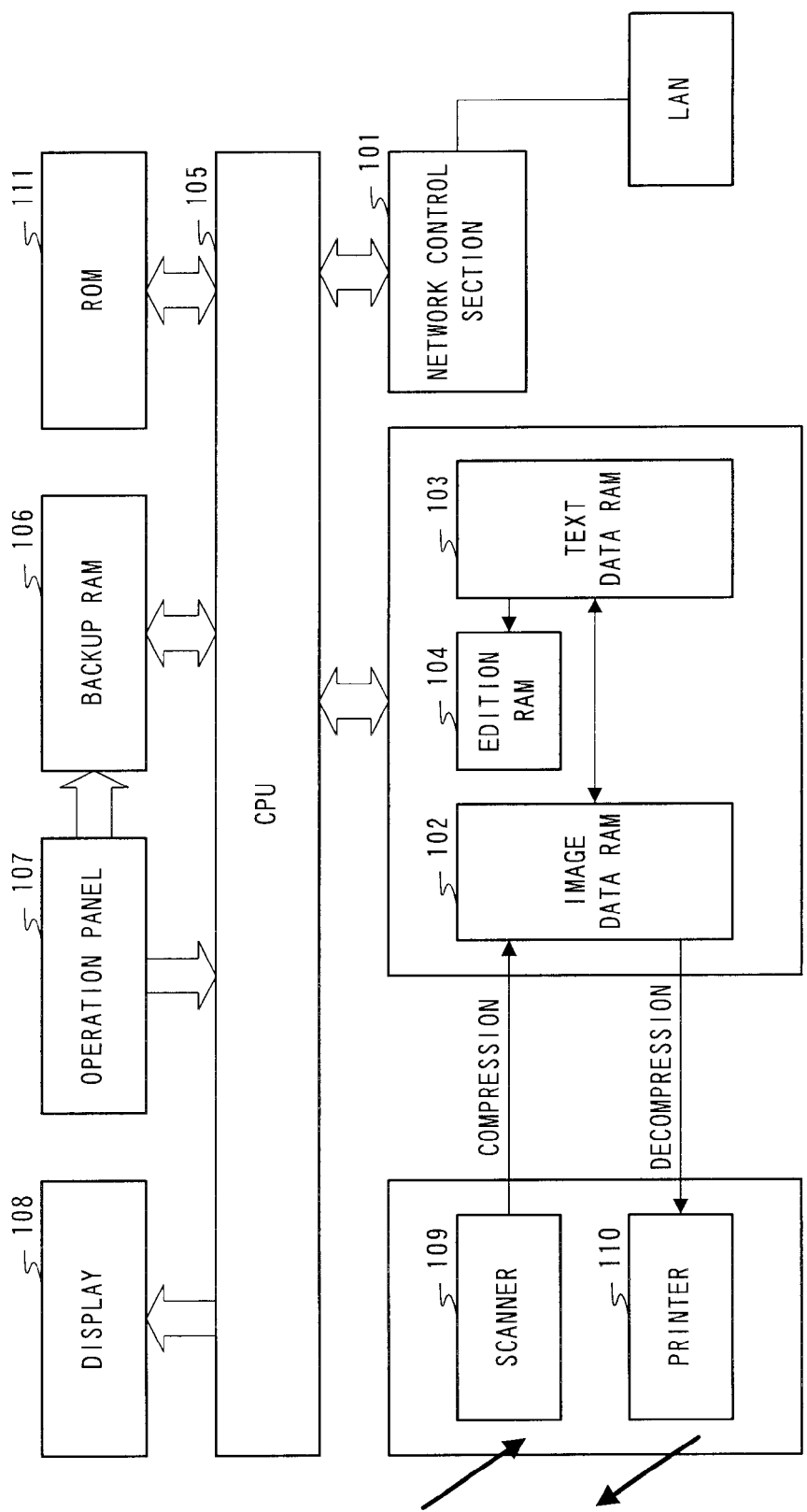
FIG. 1 is a block diagram showing a configuration of an e-mail apparatus according to one embodiment of the present invention.

FIG. 1 is a block diagram of an Internet facsimile apparatus having an e-mail apparatus of the present invention installed therein. A network control section 101 executes control for establishing connection to LAN or the Internet. The Internet facsimile apparatus receives and transmits an e-mail through the network control section 101. A CPU 105 performs an e-mail transmitting and receiving operation in accordance with an e-mail communication program stored in a ROM 111.

In an image data RAM 102, an image of an original scanned by a scanner 109 or data obtained through the network control section 101 is temporarily stored to be printed by a printer 110.

A text data RAM 103 stores data in which the image stored in the image data RAM 102 is text converted by Base 64, etc. Also, the text data RAM 103 stores e-mail data received through the network control section 101.

An edition RAM 104 provides a work area for editing an e-mail address extracted from From area in e-mail data. The From data is extracted from an e-mail content stored in the text data RAM 103 by control of CPU 105 when the e-mail is received.

A backup RAM 106 stores address data which is divided and extracted by an address edit operation. An operator can easily perform an input operation by use of information stored in the backup RAM 106 when inputting the e-mail address from the operation panel. Also, the backup RAM 106 is constituted by a nonvolatile memory. For this reason, even if the apparatus is powered off information can not be erased.

An operation panel 107 is a panel that comprises a 10-button keypad, which is necessary for operating the facsimile apparatus, a one-touch key, and alphabet keys. An operator can input a character string such as a mail address (destination), etc. by operating the operation panel 107.

A display device 108 shows an operation state of the apparatus, an error state, etc., and displays the destination input by the operation panel 107. The operator can confirm the destination by use of the display device 108. Also, there are provided scroll keys in the vicinity of the display device 108. The scroll keys scroll information displayed on the display device 108 so as to allow the operator to select information.

The scanner 109 scans the original, and the printer 110 prints data. The ROM 111 stores a program for operating the apparatus and a communication program.

In connection with the above-configured Internet facsimile apparatus, the following will explain operations, which are performed when the e-mail address is divided and stored in the backup RAM 106, with reference to FIGS. 2 to 5.

Figure 2:
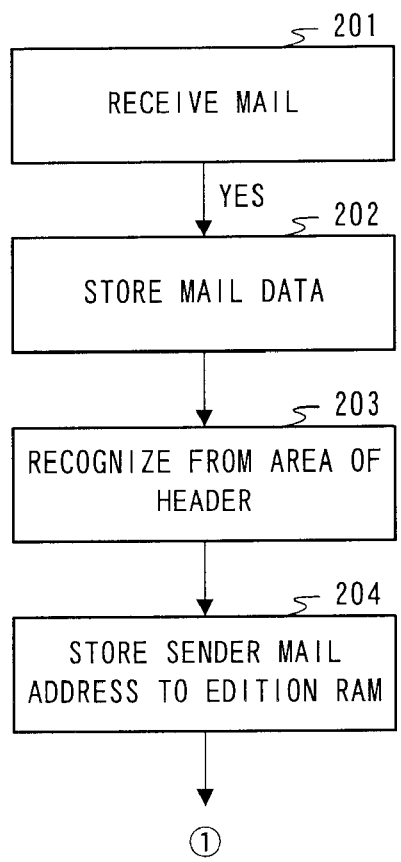
FIG. 2 is a flowchart showing mail address enter processing at an e-mail receiving time in the e-mail apparatus according to the present invention.
Figure 3:
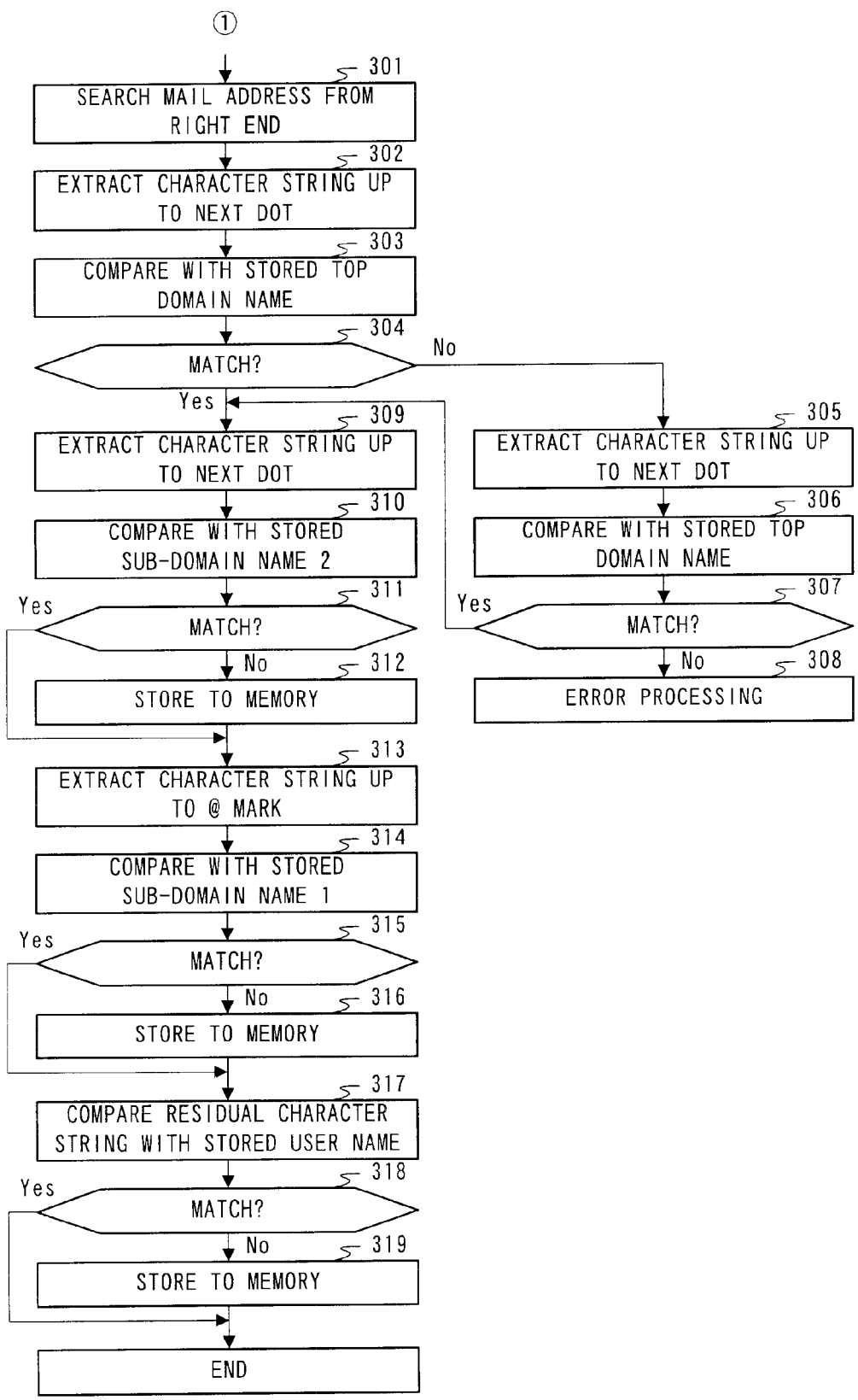
FIG. 3 is a flowchart showing a domain name edit processing in the e-mail apparatus of the present invention.

FIG. 2 is a flowchart for processing which is carried out when the mail address is entered.

In S201, S202, the network control section 101 receives an e-mail from LAN or the Internet, and stores the received e-mail to the text data RAM 103.

In S203, a character string, which is described in a From area existing in a header portion of e-mail stored in the text data RAM 103, is recognized, and the recognized character string is extracted as a sender address.

Figure 4:
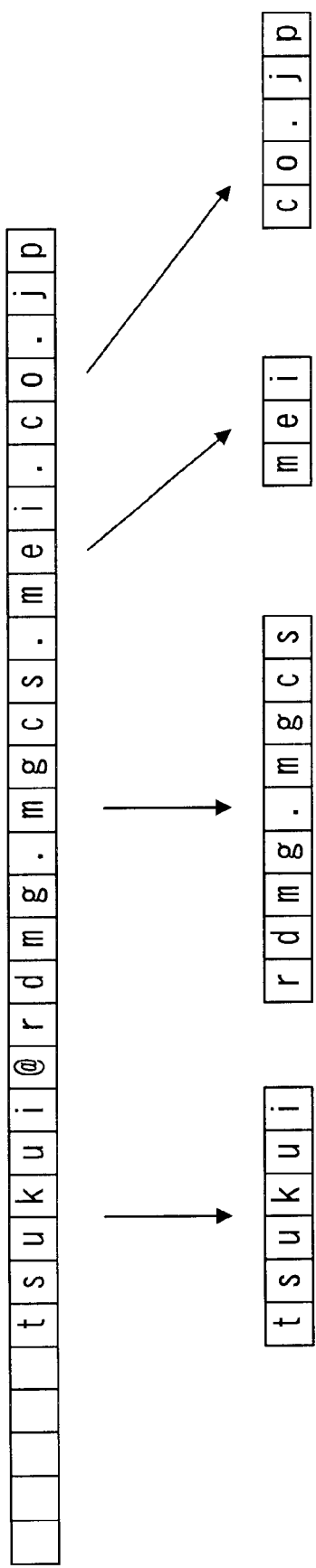
FIG. 4 is a view showing address data stored in an edition RAM.

In S204, the sender address, which is data in From area (hereinafter called From data) extracted in S203, is stored in the edition RAM 104. As shown in FIG. 4, the sender's e-mail address is divided character by character and stored to the edition RAM 104.

In the following processing, an edition, which is to divide the e-mail address stored in the edition RAM 104 for each predetermined segment, is carried out. The address edition will be explained with reference to the flowchart of FIG. 3.

As shown in FIG. 4, the e-mail address is stored in the edition RAM 104 to be recognized character by character.

In S301, a search is started character by character from an end of the e-mail address so as to detect a dot ".".

In S302, if the dot "." is detected, a character string including the search starting position to the dot "." detected position is extracted.

In S303, the character string extracted in S302 is compared with a top domain name stored in the backup RAM 106. In the example of FIG. 4, it is determined whether or not "jp" is stored in the backup RAM 106.

In S304, it is determined whether or not the extracted character string matches the top domain name.

In S305, processing, which is carried out when the extracted character string does not match the top domain name, is shown, and a character string up to a next dot is further extracted.

In S306, the character strings extracted so far are compared with the top domain name stored in the backup RAM 106. In the example of FIG. 4, it is determined whether or not "co.jp" is stored in the backup RAM 106.

In S307, it is determined whether or not the character string up to the second dot from the end of the address matches the top domain name.

In S308, processing, which is carried out when a mismatch therebetween occurs, is shown. Namely, if no top domain name can be extracted, this is regarded as occurrence of extraction error of From data, and error processing is carried out to stop division and edition processing. It should be noted whether or not processing is continued or discontinued may be selected by the operator.

Regarding the top domain name, there are one that has two character strings of "co.jp" and one that has one character string such as "com". For this reason, when no extracted top domain name is entered, the character string up to a next dot is extracted, so that the top domain name can be extracted without fail.

Since the top domain name is not arbitrarily determined but decided to some degree, the top domain name is pre-stored in the backup RAM 106.

The top domain name is thus extracted from the e-mail address of the received mail, thereafter a sub-address is extracted from the residual e-mail address.

In S309, a character string up to the next dot to serve as a sub-domain name is extracted from the residual e-mail address in which the main domain name is extracted.

In S310, the character string extracted in S309 is compared with a sub-domain name 2 stored in the backup RAM 106. In the example of FIG. 4, it is determined whether or not "mei" is stored in the backup RAM 106.

In S311, it is determined whether or not the character string extracted as sub-domain name matches the sub-domain name 2.

In S312, the character string extracted in S309 is stored in the backup RAM 106 as sub-domain name 2.

In S313, a character string up to a @ mark is further extracted from the e-mail address in which the sub-domain name 2 is extracted.

In S314, the character string extracted in S313 is compared with the sub-domain name 1 stored in the backup RAM 106. In the example of FIG. 4, it is determined whether or not "rdmg.mgcs" is stored in the backup RAM 106.

In S315, it is determined whether or not the character string extracted in S313 matches the sub-domain name 1.

In S316, processing, which is carried out when a mismatch therebetween occurs in processing of S315, is shown. Then, the extracted character string is stored to the backup RAM 106 as sub-domain name 1.

In S317, a character string left as a result of extraction so far, that is, a user name is compared with a user name stored in the backup RAM 106.

In S318, it is determined whether or not the residual character string as a user name matches the entered user name.

In S319, when a mismatch therebetween occurs in processing of S318, the extracted character string, namely, the user name is stored. Since the user name is not used so much at an input time, the user name may not be entered.

Thus, the e-mail address (character string) described in the From area is divided into the top domain name, sub-domain name 1, sub-domain name 2, the user name, respectively. Then, the character strings, which are not entered in the backup RAM 106, are stored to the corresponding portion of the backup RAM 106.

It is desirable that sub-domain 2 correspond to one dot ".". This means that the e-mail address denotes a name that manages a wider range of host as the address advances toward the end thereof. Namely, this shows a hierarchical structure, and makes it possible to deal with a wider range of address.

For example, the top domain name of "co.jp" indicates mainly Japan and the sub-domain name put before the top domain name indicates a host name in Japan. Moreover, if a sub-domain name is further put before the aforementioned sub-domain name, this indicates a host, which is in the lower hierarchy than the aforementioned host name. Note that the user name indicates a name of user, which is described at the left side of the @ mark, and that the sub-domain name indicates a host name of a company or that of a provider. Also, the top domain name indicates a name of country (e.g., jp) and an organization (e.g., co, or).

The e-mail address extracted from the received mail as a sender address is divided into the plurality of names, that is, user name, sub-domain name 1, sub-domain name 2, top domain name as shown in FIG. 5, and each name is stored. This makes it possible to read data by unit of divided character string again to be used. The user name, sub-domain name 1, sub-domain name 2, top domain name, which are divisionally stored in the backup RAM 106, are selectively read by unit of division instead of inputting all character strings of the e-mail address. This makes it easy to input the e-mail address and allows erroneous inputs to be reduced.

By dividing the e-mail address into at least two, that is, the user name and the domain name (sub-domain name, top domain name), the e-mail address can be easily managed. Also, the domain name may be divided into two, namely, top domain name, and sub-domain name.

Next, the following will explain an e-mail address input method using the user name and the domain name, which are entered in the backup RAM 106 shown in FIG. 5.

Figure 6:
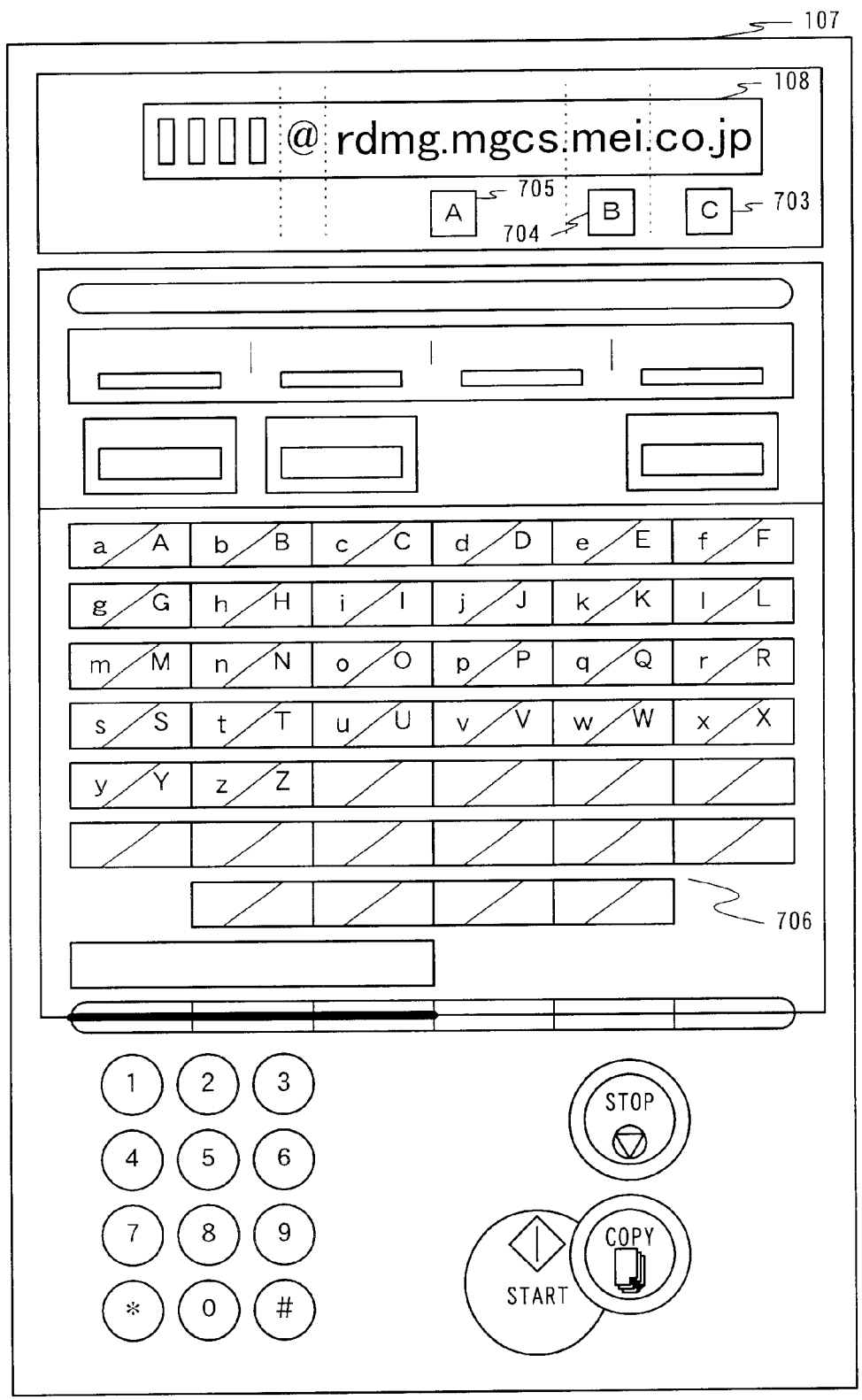
FIG. 6 is a view showing a operation panel of the e-mail apparatus of the present invention.

FIG. 6 is a plane view showing the operation panel 107 and the display device 108, which are provided in the Internet facsimile apparatus of the present invention. A scroll button 703 scrolls the top domain name to be displayed on the display device 108 from the plurality of top domain names stored in the top domain area of the backup RAM 106. Similarly, a scroll button 704 scrolls the sub-domain name 2 to be displayed on the display device 108.

Moreover, a scroll button 705 scrolls the sub-domain name 1 to be displayed on the display device 108.

These scroll buttons are arranged at the positions corresponding to the display positions of the sub-domain name, top domain mane, which are displayed by the display device 108. Also, alphabets are assigned to one-touch keys 706, respectively, so that the alphabets can be input.

Figure 7:
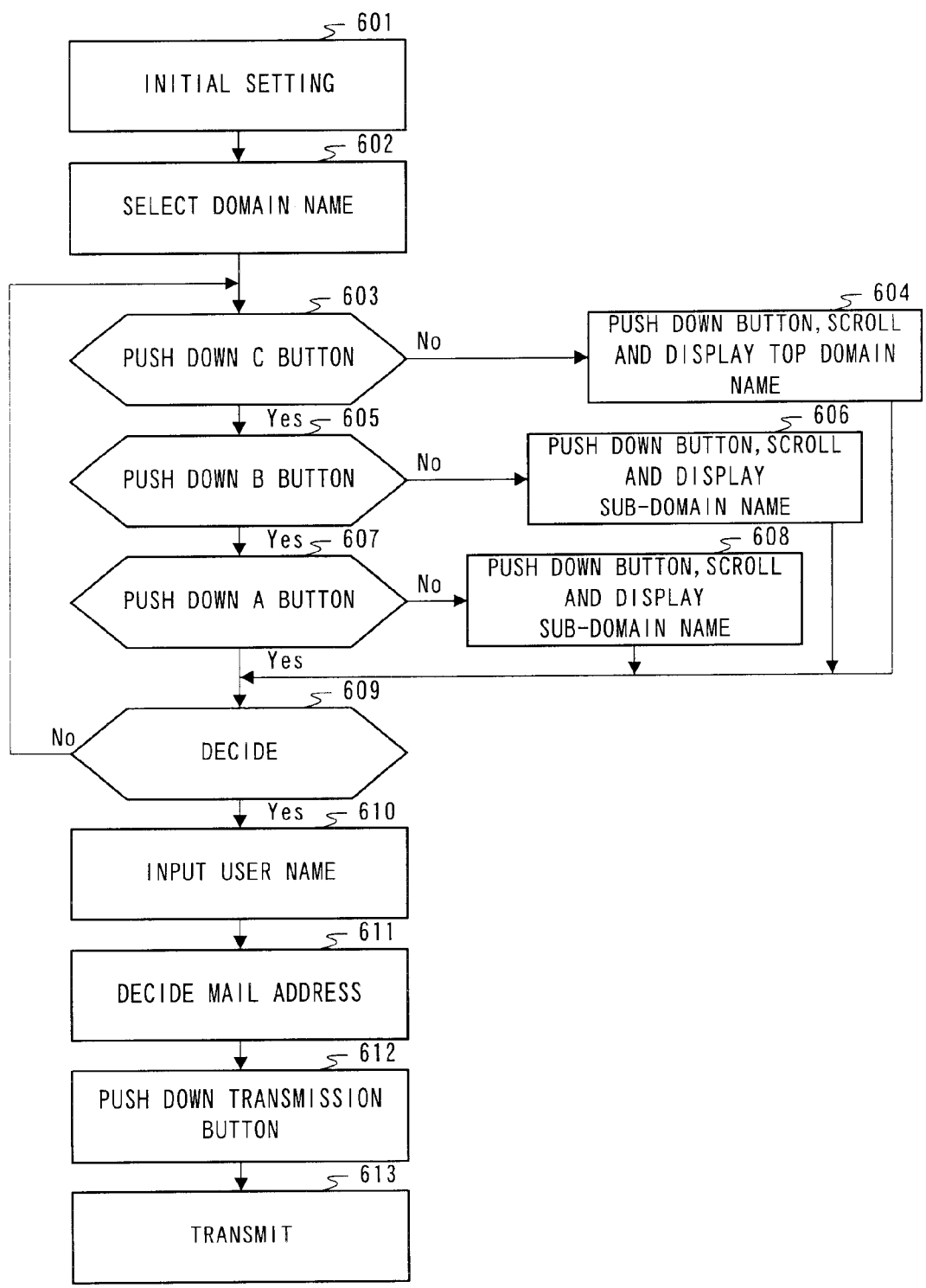
FIG. 7 is a flowchart showing operation processing at an e-mail address inputting time in the e-mail apparatus according to the present invention.

The following will explain a processing flowchart for operating the operation panel 107 and the display device 108 with reference to FIG. 7.

In S601, an initial state is displayed by the display device 108. It is desirable that the domain name with high frequency of use be first displayed. Also, in consideration of the continuous input, a new input history may be displayed. Moreover, since it is assumed that the user name is directly input from the operation panel, the portion of user name is desirably left blank. Unique data like the user name is not selected from the memory but directly input, so that an apparatus having a good usability and an easy input can be realized.

In S602, a selection of domain name is carried out to select an address.

In S603, it is determined that whether or not the scroll button 703 is pressed as a starting trigger of processing for selecting the domain name.

In S604, the scroll button 703 is depressed so as to scroll and display the top domain name. The top domain names are sequentially scrolled and displayed in accordance with the number of depressions of the scroll button 703.

In S605, it is determined that whether or not the scroll button 704 is pushed.

In S606, the scroll button 704 is pushed so as to scroll and display the sub-domain name 1.

In S607, it is determined that whether or not the scroll button 705 is pushed.

In S608, the scroll button 705 is pushed so as to scroll and display the sub-domain name 2.

In S609, an operation for decision is performed to decide that the top domain name or the sub-domain names is acceptable or not. This decision is carried out by pushing the start button 706.

In S610, a user name is inputted. In this case, the operator pushes one-touch keys 706 so as to input alphabets. Also, the user name may be input by scrolling the screen using the scroll button so as to decide the entered user name. In this case, it is necessary to provide a scroll button corresponding to the user name.

In S611, the inputted user name is ascertained, and the entirety inputted address is also ascertained.

In S612, S613, transmission is started in accordance with the depression of the start button 706.

Thus, the e-mail address is divided in a predetermined range and stored. By use of this point, the e-mail address is divided into the top domain name and sub-domain names and these names can be sequentially selected. This makes it possible to input the e-mail address easier and faster than the direct input.

Although the top domain name, sub-domain name 1, sub-domain name 2, which are stored in the backup RAM 106 shown by FIG. 5, are not related to one another, the address may be managed to be associated with each domain name.

In other words, when a predetermined top domain name is selected, only the sub-domain name, which is related to the selected top domain name, is displayed after the top domain name. Namely, after the top domain name is decided, an arbitrary domain name can be selected from the sub-domain name 2 and sub-domain name 1, which are related to the top domain name. This makes it possible to realize the apparatus having an easier input.

A specific example will be explained with reference to FIG. 8. FIG. 8 shows a management form, which is different from the form of FIG. 5, that is, an address table, which is managed by the backup RAM 106. Here, the user name, sub-domain name 1, sub-domain name 2, and top domain name are managed to be related to one another. Then, when a top domain name is selected from the top domain names so as to be decided, control is exercised such that only the sub-domain name, which is related to the top domain name, can be displayed and selected. This allows the mail address to be input more easily.

For example, if "co.jp" is selected as a top domain name, it is only "mei" that is displayable in the sub-domain name 2. Moreover, if "mei" is selected, they are only "rdmg.mgcs" and "rdsn.mgcs" that are displayable in the sub-domain name 1. Also, if "com" is selected as a top domain name, it is only "pana" that can be displayed and input in the sub-domain name 2, and "mei" cannot be input.

Namely, in this embodiment, the domain name is set as an upper hierarchy and the user name is set as a lower hierarchy. Then, in the domain name, the top domain name is set as an upper hierarchical domain name and the sub-address name is set as a lower hierarchical domain name. Then, the sub-domain name 2 is divided into sub-domain name 1 and sub-domain name 2. In this case, if the sub-domain name 2 is defined as an upper hierarchical domain name and the sub-domain name 1 is defined as a lower hierarchical domain name, only the lower hierarchical domain name that is related to the upper hierarchical domain name is displayed.

Only the lower hierarchical domain name that is related to the upper hierarchical domain name is thus allowed to be input, so that the input operation can be facilitated.

In order to carry out the above-mentioned management, it is necessary to edit the upper hierarchical domain name and lower hierarchical domain name to be associated with each other when e-mail address division and edition processing is performed.

As explained above, the user name, sub-domain name and top domain name are divisionally entered, thereby the mail address is input. This makes it possible to facilitate the input operation of the e-mail address. Also, the sub-domain name is further divisionally managed and entered. This provides general versatility to the input operation.

The present invention is not limited to the above described embodiments, and various variations and modifications may be possible without departing from the scope of the present invention.

This application is based on the Japanese Patent Application No. HEI10-264644 filed on Sep. 18, 1998, entire content of which is expressly incorporated by reference herein.

What is claimed is:

1. An e-mail apparatus comprising:

a memory that stores a plurality of top domain names and a plurality of sub-domain name in distinct fields, respectively;

an address input panel that is configured to input a destination e-mail address by selecting one of the top domain names and one of the sub-domain names, stored in said memory, the selected top domain name and sub-domain name becoming a part of the destination e-mail address, the address input panel being configured so that the destination e-mail address can be input without inputting individual characters of the domain name and the sub-domain name; and a transmitter that transmits e-mail data to the destination e-mail address.

2. The e-mail apparatus according to claim 1, further comprising:

a scanner that scans an original to obtain image data; and a converter that converts the image data into the e-mail data.

3. The e-mail apparatus according to claim 1, further comprising a display that displays the destination e-mail address.

4. The e-mail apparatus according to claim 1, wherein said address input panel comprises a first input member configured to select a top domain name and a second input member configured to select a sub-domain name.

5. The e-mail apparatus according to claim 1, wherein said address input panel comprises input keys that input a user name, the destination e-mail address including a top domain name, a sub-domain name and a user name.

6. The e-mail apparatus according to claim 1, wherein said memory is provided with a user name field in which a plurality of user names are stored.

7. An e-mail address input method comprising:

storing a plurality of top domain names and a plurality of sub-domain name in distinct fields of a memory;

inputting a destination e-mail address by selecting one of the top domain names and one of the sub-domain names, stored in the memory, the selected top domain name and sub-domain name becoming a part of the destination e-mail address, the selecting enabling the destination e-mail address to be input without inputting individual characters of the domain name and the sub-domain name; and transmitting e-mail data to the destination e-mail address.

* * * * *

UNITED STATES PATENT AND TRADEMARK OFFICE
CERTIFICATE OF CORRECTION

PATENT NO.     : 6,557,045 B1
DATED          : April 29, 2003
INVENTOR(S)    : M. Tsukui et al.

It is certified that error appears in the above-identified patent and that said Letters Patent is hereby corrected as shown below:

<u>Title page,</u>
Item [54], Title, "APPARATUS FOR EDITING E-MAIL ADDRESS AND E-MAIL APPARATUS" should be -- E-MAIL APPARATUS AND E-MAIL ADDRESS INPUT METHOD --.

Signed and Sealed this

Twenty-third Day of December, 2003

JAMES E. ROGAN
*Director of the United States Patent and Trademark Office*